(12) United States Patent
Lim et al.

(10) Patent No.: US 9,955,077 B2
(45) Date of Patent: Apr. 24, 2018

(54) CAMERA MODULE

(71) Applicant: Samsung Electro-Mechanics Co., Ltd., Suwon-si (KR)

(72) Inventors: Soo Cheol Lim, Suwon-si (KR); Sung Ryung Park, Suwon-si (KR); Chul Jin Kim, Suwon-si (KR); Jae Hyuk Kim, Suwon-si (KR); Oh Byoung Kwon, Suwon-si (KR); Byung Woo Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 14 days.

(21) Appl. No.: 14/718,200

(22) Filed: May 21, 2015

(65) Prior Publication Data

US 2015/0373272 A1 Dec. 24, 2015

(30) Foreign Application Priority Data

Jun. 20, 2014 (KR) .................. 10-2014-0076019
Dec. 5, 2014 (KR) .................. 10-2014-0173878

(51) Int. Cl.
*H04N 5/232* (2006.01)
*H04N 5/225* (2006.01)
*G02B 27/64* (2006.01)

(52) U.S. Cl.
CPC ....... *H04N 5/23287* (2013.01); *G02B 27/646* (2013.01); *H04N 5/2254* (2013.01); *H04N 5/2257* (2013.01)

(58) Field of Classification Search
CPC .................. H04N 5/23287; H04N 5/2253
See application file for complete search history.

(56) References Cited

U.S. PATENT DOCUMENTS

| 7,519,282 B2 | 4/2009 | Shin et al. |
| 2006/0269262 A1 | 11/2006 | Shin et al. |
| 2009/0303594 A1 | 12/2009 | Lim et al. |
| 2010/0091392 A1* | 4/2010 | Jung ................. G02B 7/08 359/824 |
| 2010/0123788 A1 | 5/2010 | Shin |

(Continued)

FOREIGN PATENT DOCUMENTS

| CN | 1869763 A | 11/2006 |
| CN | 102209933 A | 10/2011 |

(Continued)

OTHER PUBLICATIONS

Korean Office Action dated Feb. 4, 2016, in counterpart Korean Application No. 10-2014-0173878 (9 pages in English, 5 pages in Korean).

(Continued)

*Primary Examiner* — Twyler Haskins
*Assistant Examiner* — Fayez Bhuiyan
(74) *Attorney, Agent, or Firm* — NSIP Law

(57) ABSTRACT

A camera module includes first and second frames accommodated in housing, and a hand-shake correction unit. The hand-shake correction unit is provided on the first frame or the second frame and configured to generate a driving force in a direction perpendicular to an optical axis of a lens accommodated in the first and second frames. Sidewalls of the housing opposite to each other comprise different thicknesses.

49 Claims, 17 Drawing Sheets

(56) References Cited

U.S. PATENT DOCUMENTS

| | | | |
|---|---|---|---|
| 2011/0211821 A1 | 9/2011 | Park et al. | |
| 2012/0307088 A1* | 12/2012 | Han | H04N 5/23287 348/208.11 |
| 2013/0089311 A1* | 4/2013 | Jung | H04N 5/2257 396/55 |
| 2013/0121672 A1 | 5/2013 | Shikama et al. | |
| 2014/0160311 A1 | 6/2014 | Hwang et al. | |
| 2016/0025995 A1 | 1/2016 | Ariji | |

FOREIGN PATENT DOCUMENTS

| | | |
|---|---|---|
| CN | 102870043 A | 1/2013 |
| CN | 103869445 A | 6/2014 |
| JP | 2008-3130 A | 1/2008 |
| KR | 10-2006-0122237 A | 11/2006 |
| KR | 10-2009-0127628 A | 12/2009 |
| KR | 10-2010-0056202 A | 5/2010 |
| KR | 10-2013-0042794 A | 4/2013 |
| KR | 10-2014-0076213 A | 6/2014 |
| WO | WO 2013/121788 A1 | 8/2013 |
| WO | WO 2014/092271 A1 | 6/2014 |

OTHER PUBLICATIONS

Chinese Office Action dated Jul. 19, 2017, in corresponding Chinese Application No. 201510323238.2 (20 pages in English, 14 pages in Chinese).

\* cited by examiner

CAMERA MODULE

CROSS-REFERENCE TO RELATED APPLICATIONS

This application claims the benefits under 35 USC 119(a) of Korean Patent Application No. 10-2014-0076019 filed on Jun. 20, 2014 and Korean Patent Application No. 10-2014-0173878 filed on Dec. 5, 2014, with the Korean Intellectual Property Office, the disclosures of which are incorporated herein by reference.

BACKGROUND

1. Field

The present disclosure relates to a camera module.

2. Description of Related Art

Multi-functional subminiature camera modules are generally used in mobile communications terminals such as tablet personal computers (PC), laptop computers, and other similar electronic devices, as well as, in cellular phones such as smartphones.

As the mobile communications terminals are being manufactured in miniature sizes, an effect of shaking of hands as the mobile communications terminals are held while capturing images using camera modules included therein has increased, resulting in deteriorated image quality. Therefore, technology to correct hand-shake is required in order to obtain clear images.

When hand-shake occurs at the time of capturing an image, an optical image stabilization (OIS) actuator, using OIS technology, may be used in order to correct hand-shake.

Such an OIS actuator moves a lens module in a direction perpendicular to an optical axis direction. To this end, a suspension wire supporting the lens module is used in the OIS actuator.

However, the suspension wire used in the OIS actuator may be vulnerable to external impacts, or other external forces that result on the suspension wire being deformed during OIS driving. The deformation of the suspension wire would cause driving displacement, thereby making it difficult to secure product reliability.

In addition, a large amount of power may be consumed using such an OIS actuator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a camera module, including first and second frames accommodated in a housing; and a hand-shake correction unit provided on the first frame or the second frame and configured to generate a driving force in a direction perpendicular to an optical axis of a lens accommodated in the first and second frames, wherein sidewalls of the housing opposite to each other include different thicknesses.

A sidewall of the housing may be thicker than other sidewalls of the housing.

The first and second frames may be configured to move in a first direction perpendicular to the optical axis, relative to the housing.

The second frame may be configured to move in a second direction perpendicular to both the optical axis and the first direction, relative to the first frame.

The hand-shake correction unit may include a first hand-shake correction unit configured to generate a driving force in the first direction; and a second hand-shake correction unit configured to generate a driving force in the second direction.

A magnitude of the driving force generated by the first hand-shake correction unit may differ from a magnitude of the driving force generated by the second hand-shake correction unit.

The first hand-shake correction unit may be provided on one side surface of the second frame, and the second hand-shake correction unit is provided on another side surface of the second frame, adjacent to the one side surface of the second frame.

The first and second hand-shake correction units may be disposed to be orthogonal with respect to each other on a plane perpendicular to the optical axis.

The first hand-shake correction unit may include a first magnet on the one side surface of the second frame; and a first coil facing the first magnet.

An opening may be provided in a sidewall of the housing facing the one side surface of the second frame, and the first coil may be disposed within the opening.

The second hand-shake correction unit may include a second magnet on the another side surface of the second frame adjacent to the one side surface thereof; and a second coil facing the second magnet.

An opening may be provided in a sidewall of the housing facing the another side surface of the second frame, and the second coil may be disposed within the opening.

The housing and the first frame may have a first ball bearing unit which is provided therebetween and is configured to roll in a first direction perpendicular to the optical axis.

The housing and the first frame may include a first accommodating groove accommodating the first ball bearing unit therein.

The first accommodating groove may be configured to guide a rolling motion of the first ball bearing unit in the first direction and to limit movement of the first ball bearing unit in directions perpendicular to the first direction.

The first accommodating groove may be provided in four corners of an inner bottom surface of the housing and four corners of a lower surface of the first frame.

The first and second frames may have a second ball bearing unit provided therebetween, and the second ball bearing unit may be configured to roll in a second direction perpendicular to both the first direction and the optical axis.

The first and second frames may include a second accommodating groove accommodating the second ball bearing unit therein.

The second accommodating groove may be configured to guide a rolling motion of the second ball bearing unit in the second direction and to limit movement of the second ball bearing unit in directions perpendicular to the second direction.

The second accommodating groove may be provided in four corners of an upper surface of the first frame and four corners of a lower surface of the second frame.

Magnetic force may act in an optical axis direction between the housing and the hand-shake correction unit.

The housing may be provided with a yoke part facing the hand-shake correction unit in the optical axis direction.

Magnetic attractive force may act between the hand-shake correction unit and the yoke part.

The hand-shake correction unit may include a first hand-shake correction unit configured to generate a driving force in a first direction perpendicular to the optical axis, and a second hand-shake correction unit configured to generate a driving force in a second direction perpendicular to the first direction and the optical axis, and the yoke part may include a first yoke facing the first hand-shake correction unit in an optical axis direction, and a second yoke facing the second hand-shake correction unit in the optical axis direction.

In accordance with another embodiment, there is provided camera module including first and second frames disposed within a housing in an optical axis direction; and a hand-shake correction unit provided on the first frame or the second frame to generate a driving force in directions perpendicular to the optical axis direction, wherein centers of the first and second frames are disposed to be offset from a center of the housing, and the first and second frames are configured to limit movement thereof in the optical axis direction and to limit rotation thereof on an optical axis.

The housing and the first frame may include a first ball bearing unit provided therebetween, and the first ball bearing unit is configured to roll in a first direction perpendicular to the optical axis direction.

The housing and the first frame may include a first accommodating groove accommodating the first ball bearing unit therein.

The first ball bearing unit accommodated in the first accommodating groove may be configured such that movement thereof is limited in a second direction perpendicular to the optical axis direction and the first direction, and the first accommodating groove may be longer in the first direction than in the second direction.

The first and second frames may have a second ball bearing unit which is provided therebetween, and the second ball bearing unit may be configured to roll in a second direction perpendicular to both the optical axis direction and the first direction.

The first and second frames may include a second accommodating groove accommodating the second ball bearing unit therein.

The second ball bearing unit accommodated in the second accommodating groove may be configured such that movement thereof is limited in the optical axis direction and the first direction, and the second accommodating groove may be longer in the second direction than in the first direction.

The housing may be provided with a yoke part facing the hand-shake correction unit in the optical axis direction.

The yoke part and the hand-shake correction unit may produce a magnetic attractive force.

In accordance with a further embodiment, there is provided a camera module, including a lens barrel; and a housing accommodating the lens barrel therein, wherein a center of the lens barrel is disposed to be offset from a center of the housing when viewed from an optical axis direction.

The center of the lens barrel may be spaced apart from the center of the housing in a diagonal direction.

In accordance with an embodiment, there is provided a camera module, including a first frame and a second frame accommodating a lens barrel; a first hand-shake correction unit configured to generate a driving force to enable movement of the first and second frames in a first direction; and a second hand-shake correction unit configured to generate a driving force to enable movement of the second frame in a second direction, perpendicular to the first direction, wherein the first hand-shake correction unit is provided on one external side surface of the first frame or the second frame, and the second hand-shake correction unit is provided on another external side surface of the first frame or the second frame.

The first and the second directions may be perpendicular to an optical axis of the lens barrel.

The second hand-shake correction unit may be provided on the another external side surface of the first frame or the second frame, adjacent to the one external side surface or opposite to the one external side surface.

The first and second hand-shake correction units may be disposed to be orthogonal with respect to each other on the plane perpendicular to an optical axis direction of the lens barrel.

The camera module may also include a first ball bearing unit configured to support a movement of the first and second frames with respect to a housing; and a second ball bearing unit configured to support a movement of the second frame with respect to the first frame.

The first hand-shake correction unit may include a first magnet and a first coil facing the first magnet configured to generate the driving force in the first direction.

The second hand-shake correction unit may include a second magnet and a second coil facing the second magnet configured to generate the driving force in the second direction.

The first and second coils may be disposed to face the first and second magnets, respectively, in directions perpendicular to an optical axis.

The camera module may also include a housing with sidewalls including spaces to accommodate the magnets and the coils.

The spaces may be on one side of the housing in the first direction and on one side of the housing in the second direction, and a center of the lens barrel may be biased toward another side of the housing in the first direction and another side of the housing in the second direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
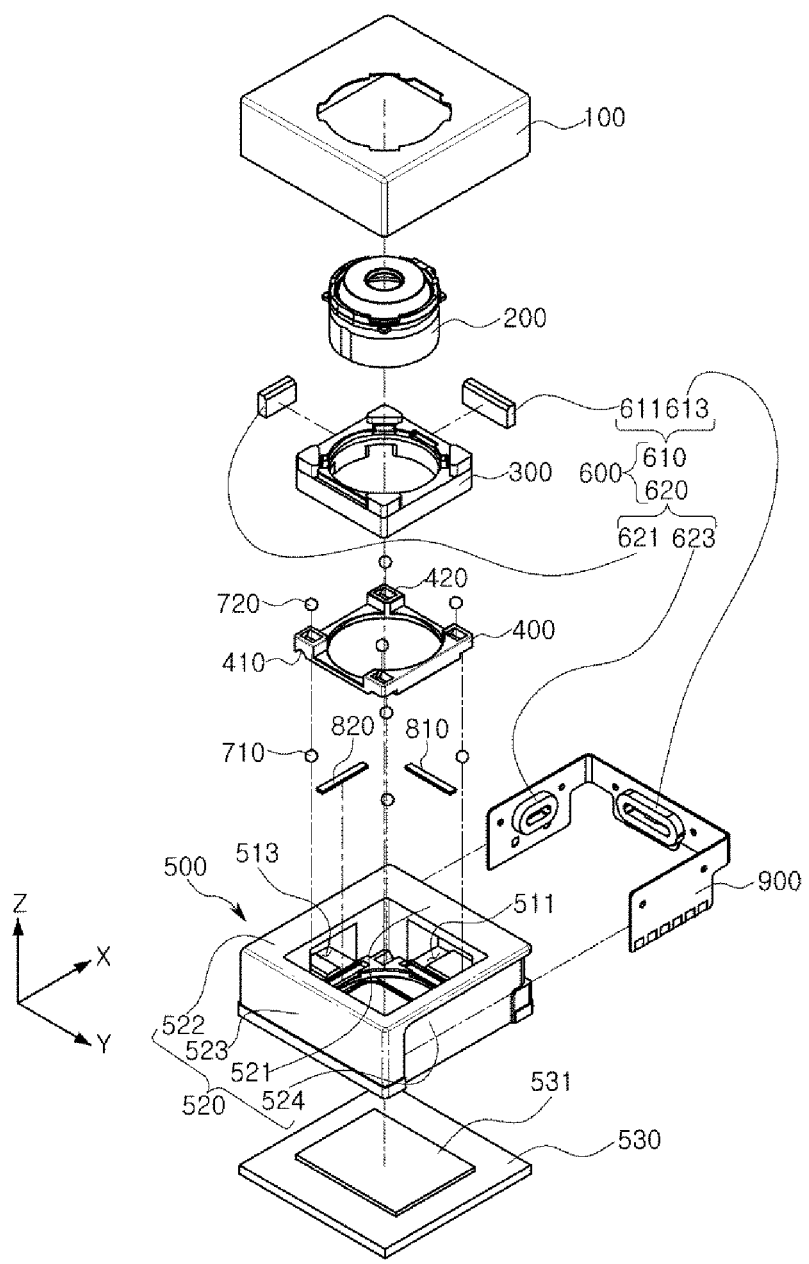
FIG. 1 is a schematic exploded perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the drawings, the shapes and dimensions of elements may be exaggerated for clarity, and the same reference numerals will be used throughout to designate the same or like elements.

Terms with respect to directions will be defined hereinafter. As viewed in FIG. 1, an optical axis direction (a Z direction) refers to a vertical direction on the basis of a lens barrel, a first direction (an X direction) refers to a direction perpendicular to the optical axis direction (the Z direction), and a second direction (a Y direction) refers to a direction perpendicular to both the optical axis direction (the Z direction) and the first direction (the X direction).

Figure 2:
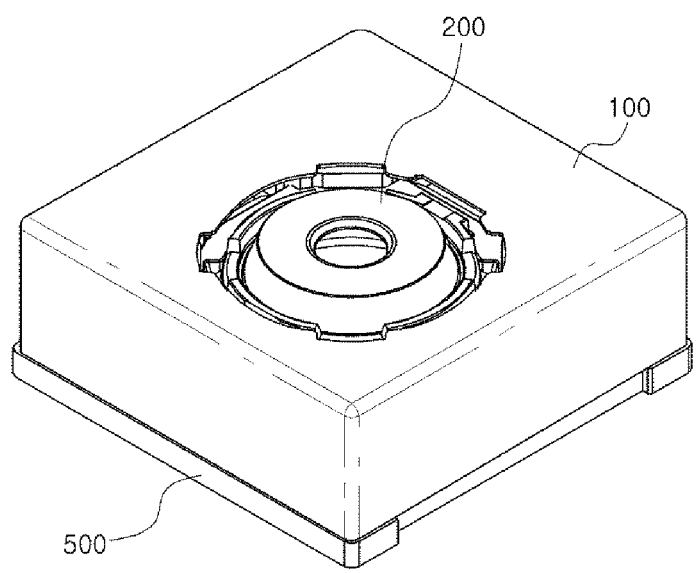
FIG. 2 is an assembled perspective view of the camera module, according to an embodiment.
Figure 3:
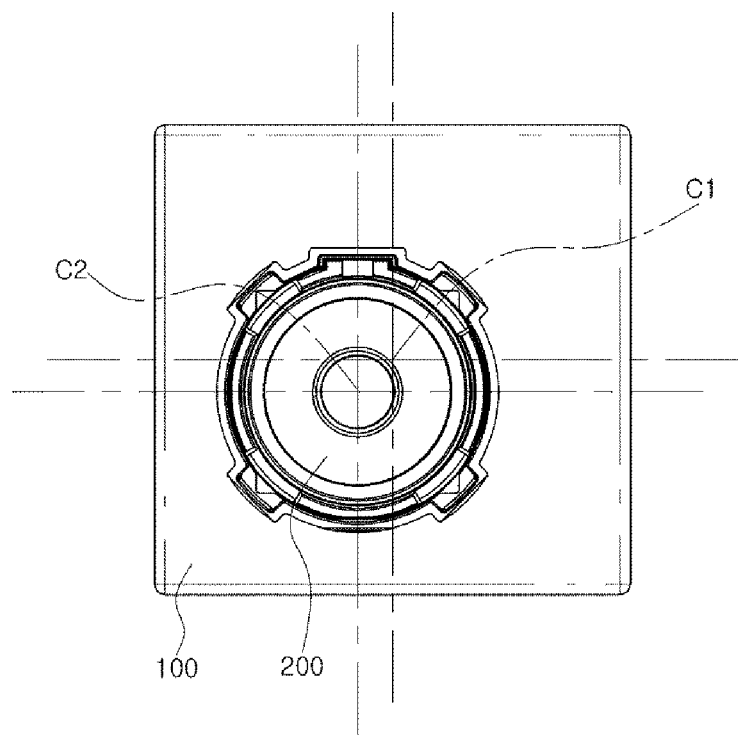
FIG. 3 is a plan view of the camera module, according to an embodiment.

FIG. 1 is a schematic exploded perspective view of a camera module, according to an embodiment. FIG. 2 is an assembled perspective view of the camera module, according to an embodiment. FIG. 3 is a plan view of the camera module, according to an embodiment. FIGS. 1, 2, and 3 illustrate structural elements associated with the camera module. A person of ordinary skill in the relevant art will appreciate that additional or fewer structural elements may be included in the configuration of the camera module without departing from the core of the intended configuration of the camera module.

Referring to FIG. 1, the camera module includes a housing 500, a first frame 400 and a second frame 300 accommodated in the housing 500, a case 100 coupled to the housing 500, and a hand-shake correction unit 600.

A lens barrel 200 is accommodated in the first and second frames 400 and 300. For example, the lens barrel 200 is inserted into and fixed to openings formed in the first and second frames 400 and 300.

The lens barrel 200 has a hollow cylindrical shape to accommodate a plurality of lenses for imaging subjects. The lenses are provided in the lens barrel 200 along an optical axis.

A number of lenses may be provided, depending on a design of the lens module 200. For example, the number of lenses includes six lenses. Also, the lenses may have respective optical characteristics such as the same or different reflective indices.

In one illustrative configuration, the first and second frames 400 and 300 are sequentially disposed in the housing 500. Therefore, the first frame 400 is disposed between the housing 500 and the second frame 300.

In addition, the first and second frames 400 and 300 are disposed to be spaced apart from each other along the optical axis direction (the Z direction) within the housing 500.

For example, an inner bottom surface of the housing 500 and a lower surface of the first frame 400 are disposed to be spaced apart from each other in the optical axis direction (the Z direction), and an upper surface of the first frame 400 and a lower surface of the second frame 300 are also disposed to be spaced apart from each other in the optical axis direction (the Z direction).

The first and second frames 400 and 300 are accommodated in the housing 500.

In addition, a first substrate 530, onto which an image sensor is mounted, is coupled to a lower portion of the housing 500.

The housing 500 is open in the optical axis direction (the Z direction) to allow external light to be incident from a lower portion of the housing 500 and collected on the image sensor.

The case 100 is coupled to the housing 500 to enclose the exterior of the housing 500, and serves to block electromagnetic waves generated when the camera module is being driven. In other words, when the camera module is driven, electromagnetic waves are generated. In a case in which electromagnetic waves are discharged externally, the case 100 prevents the electromagnetic waves from negatively affecting other electronic components that cause communications errors therein or malfunctioning thereof. In an embodiment, the case 100 is formed of metal such that the case 100 is grounded by a ground pad provided on the first substrate 530. As a result, the case 100 blocks electromagnetic waves.

In addition, in a case in which the case 100 is formed as a plastic injection-molded product, a conductive paint is applied onto an inner surface of the case 100 to block electromagnetic waves.

The conductive paint may be a conductive epoxy, but is not limited thereto. That is, various conductive materials may be used as the conductive paint. A conductive film or conductive tape may be attached to the inner surface of the case 100.

The first and second frames 400 and 300 are disposed to be relatively movable with respect to the housing 500.

In addition, the second frame 300 is disposed to be movable, relative to the first frame 400 within the housing 500.

The camera module, according to an embodiment, also includes the hand-shake correction unit 600.

The hand-shake correction unit 600 is configured to correct blurring of an image or shaking of a moving picture due to factors such as shaking of the hands of a user ("hand-shake" of the user) at the time that an image is taken or captures or a video footage is recorded.

In one illustrative example, the hand-shake correction unit 600 is configured to enable, allow, or provide a relative displacement corresponding to the hand-shake to the first and second frames 400 and 300 when the hand-shake of the user occurs at the time of capturing the image. As a result, at least one of the many advantages and/or benefits associated with the hand-shake correction unit 600 is to compensate for the hand-shake.

The hand-shake correction unit 600 includes a first hand-shake correction unit 610 allowing, permitting, or enabling the first and second frames 400 and 300 to be movable in the first direction (the X direction) and a second hand-shake correction unit 620 allowing, permitting, or enabling the second frame 300 to be movable in the second direction (the Y direction).

The first hand-shake correction unit 610 includes a first magnet 611 and a first coil 613 facing the first magnet 611, in order to generate a driving force in the first direction (the X direction). In accordance with one configuration, the first hand-shake correction unit 610 includes a first hall sensor in order to sense a position of the first magnet 611. In one configuration, the first hall sensor is an integral part of the first hand-shake correction unit 610. In an alternative configuration, the first hall sensor is a separate or removable structural element of the first hand-shake correction unit 610.

In addition, the second hand-shake correction unit 620 includes a second magnet 621 and a second coil 623 facing the second magnet 621, in order to generate a driving force in the second direction (the Y direction). In accordance with one configuration, the second hand-shake correction unit 620 includes a second hall sensor in order to sense a position of the second magnet 621. In one configuration, the second hall sensor is an integral part of the second hand-shake correction unit 620. In an alternative configuration, the first hall sensor is a separate or removable structural element of the second hand-shake correction unit 620.

The first hand-shake correction unit 610 is provided on one external side surface of the second frame 300, and the second hand-shake correction unit 620 is provided on another external side surface of the second frame 300 adjacent to the one external side surface. In an alternative configuration, the first hand-shake correction unit 610 is provided on one external side surface of the second frame 300, and the second hand-shake correction unit 620 is provided on another external side surface of the second frame 300 opposite to the one external side surface. As a further alternative configuration, the first hand-shake correction unit 610 and the second hand-shake correction unit 620 are provided on external side surfaces of the first frame 400.

As shown in FIG. 1, the first and second magnets 611 and 621 are mounted on the second frame 300.

The first and second coils 613 and 623 are disposed to face the first and second magnets 611 and 621, respectively, in directions perpendicular to the optical axis direction (the Z direction). The first and second coils 613 and 623 are mounted on a second substrate 900 and the second substrate 900 is fixed to the housing 500.

In one configuration, the first and second magnets 611 and 621 are disposed to be orthogonal with respect to each other on a plane perpendicular to the optical axis direction (the Z direction). Therefore, the first and second hand-shake correction units 610 and 620 are disposed to be orthogonal with respect to each other on the plane perpendicular to the optical axis.

The first hand-shake correction unit 610 produces or generates a driving force in the first direction (the X direction) through an electromagnetic influence between the first magnet 611 and the first coil 613. In addition, the second hand-shake correction unit 620 produces or generates driving force in the second direction (the Y direction) through an electromagnetic influence between the second magnet 621 and the second coil 623.

Therefore, the first and second frames 400 and 300 are movable in the first direction (the X direction) by the driving force of the first hand-shake correction unit 610. The second frame 300 is movable in the second direction (the Y direction) by the driving force of the second hand-shake correction unit 620.

For example, the first frame 400 is movable together with the second frame 400 relative to the housing 500 by the first hand-shake correction unit 610. The second frame 300 is movable relative to the first frame 400 by the second hand-shake correction unit 620.

In one illustrative example, a first ball bearing unit 710 is provided to support the relative movement of the first and second frames 400 and 300 with respect to the housing 500. A second ball bearing unit 720 is provided to support the relative movement of the second frame 300 with respect to the first frame 400.

This will be described below in detail with reference to FIGS. 4A through 9B.

Referring to FIGS. 2 and 3, in the camera module according to an embodiment, a center C2 of the lens barrel 200 is disposed to be spaced apart from a center C1 of the housing 500 or a center of the case 100.

For example, as viewed in the optical axis direction (the Z direction), the center of the lens barrel 200 is disposed to be offset from that of the housing 500.

As illustrated in FIG. 1, the upper and lower portions of the housing 500 are open, and four sidewalls 521 to 524 thereof extend in the optical axis direction (the Z direction).

Two sidewalls 521 and 523 of the four sidewalls are opposite to each other in the first direction (the X direction), and the other two sidewalls 522 and 524 thereof are opposite to each other in the second direction (the Y direction).

The two sidewalls 521 and 523 that are opposite to each other in the first direction (the X direction) have different thicknesses, and the two sidewalls 522 and 524 that are opposite to each other in the second direction (the Y direction) have different thicknesses. In an alternative configuration, the two sidewalls 521 and 523 that are opposite to each other in the first direction (the X direction) have same or equal thicknesses. In another configuration, the two sidewalls 522 and 524 that are opposite to each other in the second direction (the Y direction) have same or equal thicknesses.

In one example, the thicknesses are measured along the first direction (the X direction) or the second direction (the Y direction). For example, the sidewalls 521 and 522 of the housing 500 in which the hand-shake correction unit 600 is disposed are thicker than the sidewalls 523 and 524 of the housing 500 in which the hand-shake correction unit 600 is not disposed.

Because the hand-shake correction unit 600 includes the magnets and the coils as described above, the sidewalls 521 and 522 of the housing 500 include spaces to accommodate the magnets 611 and 621 and the coils 613 and 623. For example, an opening 511 is formed in the sidewall 521 of the housing 500 facing one side surface of the second frame 300 including the first magnet 611 to penetrate through the sidewall 521 of the housing 500. The second substrate slides into and is positioned onto the housing 500 and the first coil 613 is disposed in the opening 511, opposite to the first magnet 611. In addition, an opening 513 is also formed in the sidewall 522 of the housing 500 facing another side surface of the second frame 300 including the second magnet 621 to penetrate through the sidewall 522 of the housing 500. The second substrate slides into and is positioned onto the housing 500 and the second coil 623 is disposed in the opening 513, opposite to the second magnet 621.

In accordance with one example, because the spaces 511 and 513 in which the first and second coils 613 and 623 are to be disposed are formed in the sidewalls 521 and 522 of the housing 500 facing one side surface and another side surface of the second frame 300, respectively, the sidewalls 521 and 522 of the housing 500 in which the hand-shake correction unit 600 is disposed may be thicker than the sidewalls 523 and 524 in which the hand-shake correction unit 600 is not disposed.

Referring to FIG. 1, in the camera module according to an embodiment, the first magnet 611 and the first coil 613 of the first hand-shake correction unit 610 are disposed on one side of the housing 500 in the first direction (the X direction), and the second magnet 621 and the second coil 623 of the second hand-shake correction unit 620 are disposed on one side of the housing 500 in the second direction (the Y direction).

That is, because the spaces in which the first and second hand-shake correction units 610 and 620 are to be disposed are on one side of the housing 500 in the first direction (the X direction) and on one side of the housing 500 in the second direction (the Y direction), the sidewalls 521 and 522 of the housing 500 in which the hand-shake correction units 610 and 620 are disposed are formed to be relatively thick.

Therefore, the center of the lens barrel 200 accommodated in the housing 500 is biased toward the other side of the housing 500 in the first direction (the X direction) and the other side of the housing 500 in the second direction (the Y direction) within the housing 500.

Therefore, the center C2 of the lens barrel 200 is disposed at a predetermined distance from the center C1 of the housing 500 or the center of the case 100.

For example, the center C2 of the lens barrel 200 is disposed at a distance from the center C1 of the housing 500 in a diagonal direction.

In the camera module, according to an embodiment described above, spaces are saved in the other side of the housing 500 in the first direction (the X direction) and the other side of the housing 500 in the second direction (the Y direction) due to the disposition of the hand-shake correction unit 600. Therefore, in accordance with at least one advantage associated with the configuration of the camera module described above, an overall size of the camera module is decreased. As a result, the camera module, according to an embodiment, may be mounted in a relatively small space within a portable electronic device. In one example, in a case in which a camera module is mounted on a front surface of the portable electronic device on which a display unit is disposed and another camera module is mounted on a rear surface of the portable electronic device, the size of the camera module mounted on the front surface of the portable electronic device is decreased.

In one example, the display unit is disposed on the front surface of the portable electronic device, and thus, a space in which the camera module is to be mounted is small in a case in which the size of the display unit is large.

In accordance with an illustrative example, the camera module mounted on the front surface of the portable electronic device includes a hand-shake correction unit in order to obtain a clear image by decreasing an influence of hand-shake at the time an image is captured.

In accordance with an embodiment, the camera module described above includes the hand-shake correction unit 600 which is configured to enable, permit, or allow the housing 500 to have the sidewalls having different thicknesses, thereby being miniaturized. Thus, the configuration of the camera module including the hand-shake correction unit 600 provides a benefit of eliminating poor quality images being taken or recorded as a result of a user's hand shaking or moving while taking the images and provides an advantage of enabling a size of a display unit to be increased on a front surface of a portable electronic device.

In addition, in a case in which the shape of the portable electronic device is changed, for example, in a case in which the size of the display unit on the front surface of the portable electronic device is increased, the size of the camera module changes depending on the shape of the portable electronic device. In this case, the internal configuration of the camera module, needs to be entirely changed, which may be problematic.

However, the camera module according to an embodiment, may be miniaturized without entirely changing the internal configuration by disposing the center C2 of the lens barrel 200 to be spaced apart from the center C1 of the housing 500 or the center of the case 100.

Therefore, the configuration of the camera module, according to an embodiment, provides a significant degree of design freedom, based on shapes of the portable electronic device.

Next, the configuration and driving of the hand-shake correction unit 600 will be described.

Figure 4A:
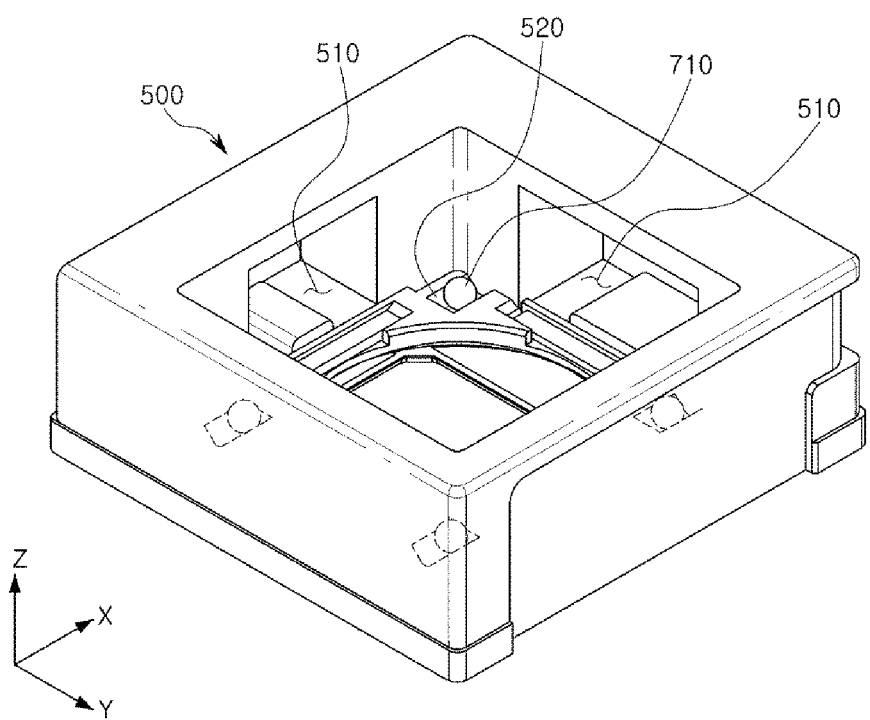
FIG. 4A is a perspective view of a housing and a first ball bearing unit provided in the camera module, according to an embodiment.
Figure 4B:
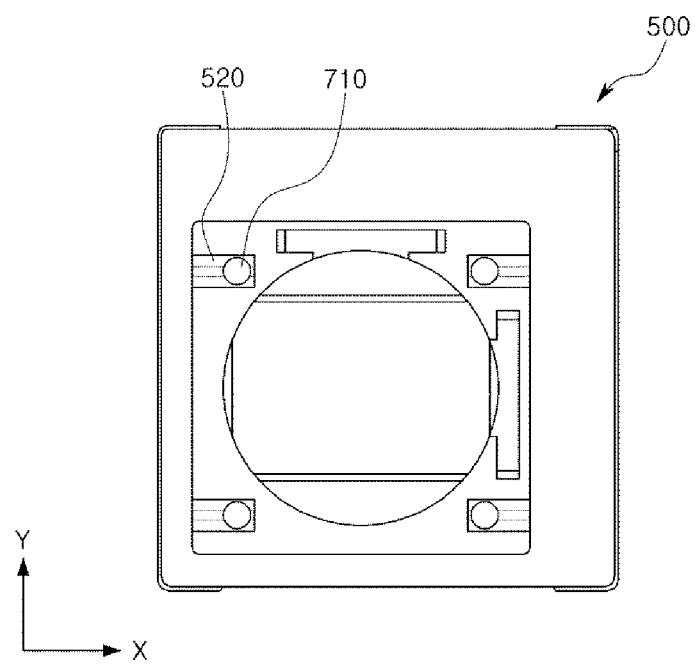
FIG. 4B is a plan view of the housing and the first ball bearing unit provided in the camera module, according to an embodiment.

FIG. 4A is a perspective view of the housing and the first ball bearing unit provided in the camera module according to an embodiment; while FIG. 4B is a plan view of the housing and the first ball bearing unit provided in the camera module according to an embodiment.

Figure 5A:
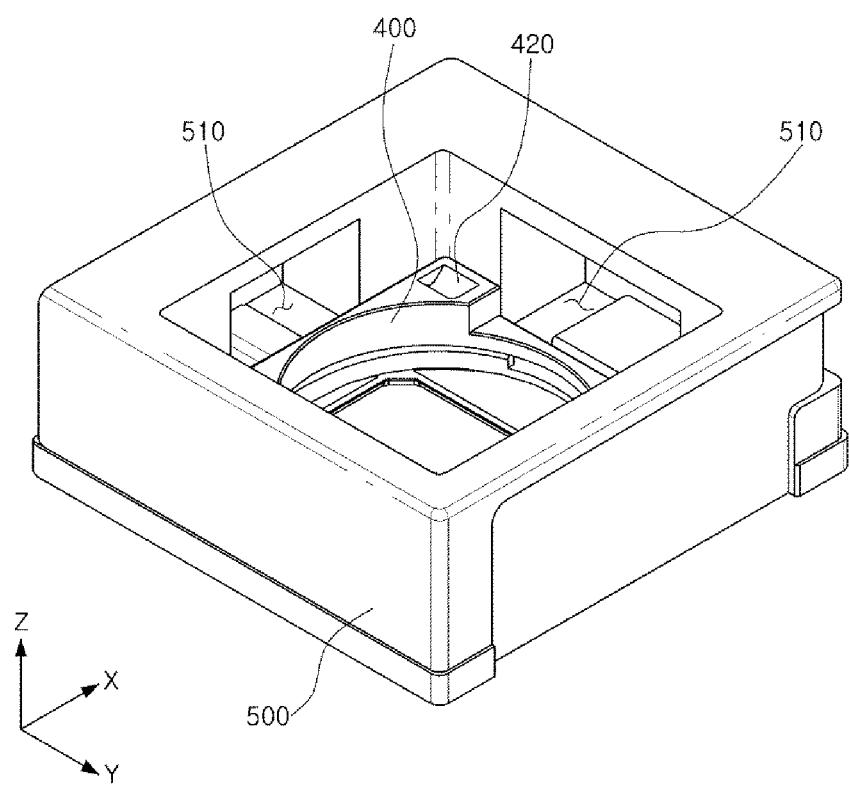
FIG. 5A is a perspective view illustrating a form in which a first frame is accommodated in the housing of the camera module, according to an embodiment.
Figure 5B:
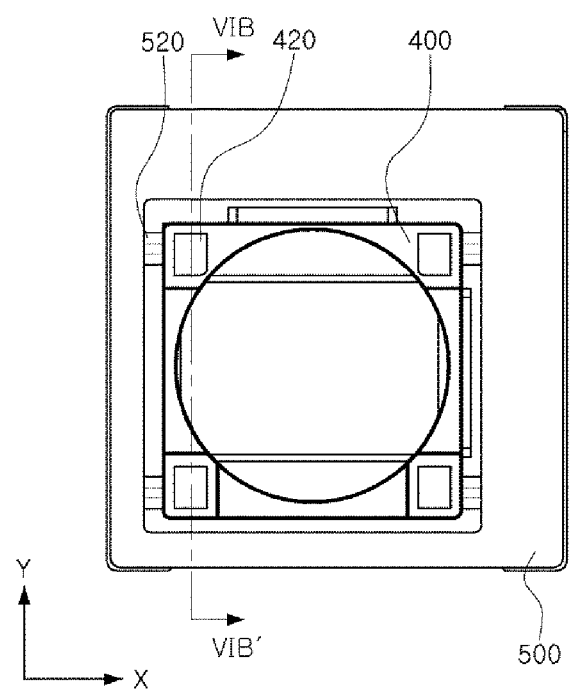
FIG. 5B is a plan view illustrating the form in which the first frame is accommodated in the housing of the camera module, according to an embodiment.

In addition, FIG. 5A is a perspective view illustrating a form in which the first frame is accommodated in the housing provided in the camera module, according to an embodiment. FIG. 5B is a plan view illustrating the form in which the first frame is accommodated in the housing provided in the camera module, according to an embodiment.

Figure 6A:
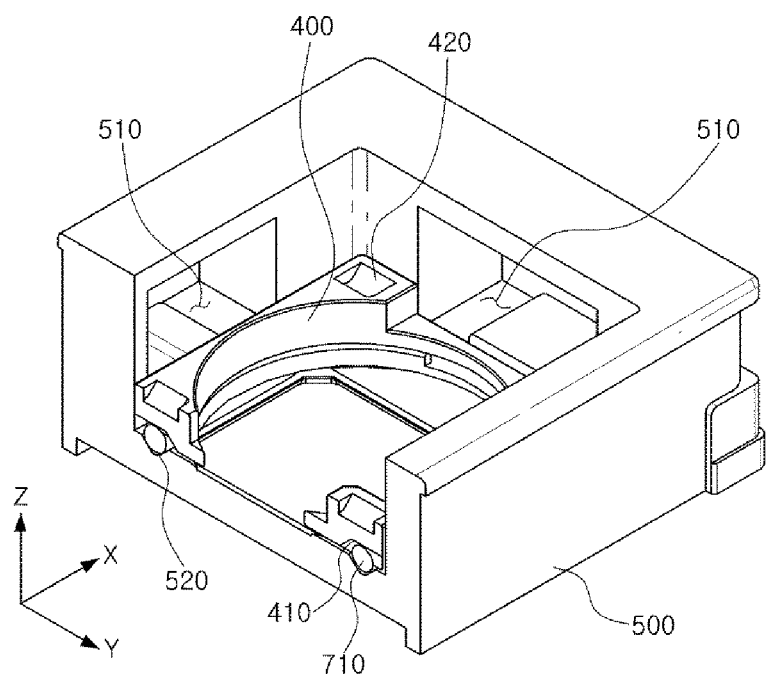
FIG. 6A is a partially cut-away perspective view of FIG. 5A.
Figure 6B:
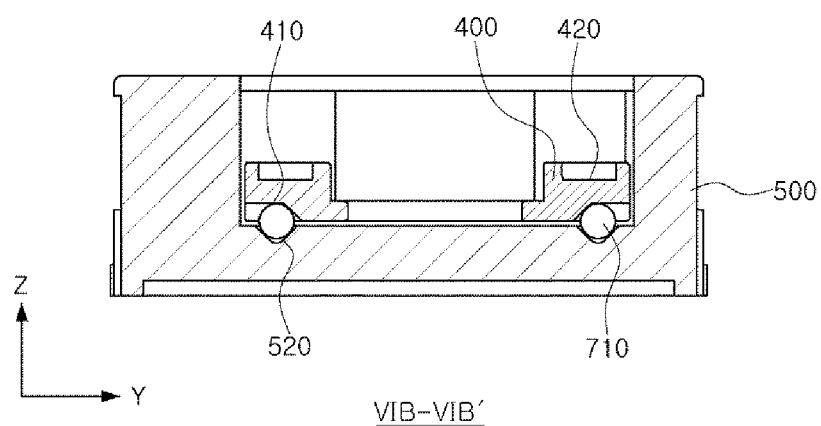
FIG. 6B is a cross-sectional view taken along line VIB-VIB' of FIG. 5B.

In addition, FIG. 6A is a partially cut-away perspective view of FIG. 5A. FIG. 6B is a cross-sectional view taken along line A-A' of FIG. 5B.

First, the first hand-shake correction unit 610 will be described.

The first frame 400 is accommodated in the housing 500, and is movable in the first direction (the X direction) by the first hand-shake correction unit 610.

In one example, the first ball bearing unit 710 is provided between the housing 500 and the first frame 400. As illustrated, the first ball bearing unit 710 includes four ball bearings in one embodiment, but the number of ball bearings is not limited thereto. The first ball bearing unit 710 may include more than four ball bearings. The first ball bearing unit 710 supports the first frame 400 so that the first frame 400 is movable in the first direction (the X direction), while maintaining an interval from the housing 500.

The housing 500 and the first frame 400 include first accommodating grooves 520 and 410 (FIG. 1), respectively, the first accommodating grooves 520 and 410 accommodating the ball bearings of the first ball bearing unit 710 therein.

The first accommodating grooves 520 and 410 are formed in the inner bottom surface of the housing 500 and the lower surface of the first frame 400, respectively.

For example, the first accommodating grooves 520 and 410 are formed in four corners of the inner bottom surface of the housing 500 and four corners of the lower surface of the first frame 400, respectively.

The first ball bearing unit 710 is fitted into the first accommodating grooves 520 and 410 so that the housing 500 and the first frame 400 are spaced apart from each other in the optical axis direction (the Z direction).

The first accommodating grooves 520 and 410 guide the rolling motion of the first ball bearing unit 710 in the first direction (the X direction) and limit the movement of the first ball bearing unit 710 in a direction perpendicular to the first direction (the X direction). For example, a width of each of the first accommodating grooves 520 and 410 (in the Y direction) correspond to a size of each ball bearing of the first ball bearing unit 710. A length of each of the first accommodating grooves 520 and 410 (in the X direction) is long enough in the first direction (the X direction) to allow the first ball bearing unit 710 to roll in the first direction. In other words, the first accommodating grooves 520 and 410 may be longer in the first direction (the X direction) than in the second direction (the Y direction). Therefore, the first ball bearing unit 710 rolls in the first direction (the X direction), while the movement thereof may be limited in the optical axis direction (the Z direction) and the second direction (the Y direction).

Therefore, the first frame 400 is movable in the first direction (the X direction) by the first hand-shake correction unit 610 while being supported by the first ball bearing unit 710.

Although only the first frame 400 is accommodated in the housing 500 as illustrated in FIGS. 4A through 6B for illustrative purposes, the second frame 300 may also be accommodated in the housing 500. Thus, the second frame 300 may also be movable in the first direction (the X direction) depending on the movement of the first frame 400. In this example, the first and second frames 400 and 300 move relative to the housing 500 by the first hand-shake correction unit 610. As a result, hand-shake correction is made in the first direction (the X direction).

Because the movement of the first ball bearing unit 710 is limited in the optical axis direction (the Z direction) and the second direction (the Y direction), the first and second frames 400 and 300 move in the first direction (the X direction) by the driving force of the first hand-shake correction unit 610.

Furthermore, the first accommodating grooves 520 and 410 are provided in the four corners of the inner bottom surface of the housing 500 and the four corners of the lower surface of the first frame 400, respectively, and the four first ball bearings 710 are also provided to correspond to the first accommodating grooves 520 and 410.

Therefore, the rotation of the first and second frames 400 and 300 on the optical axis is limited. For example, in a case in which the driving force of the first hand-shake correction unit 610 is not transferred to central portions of the side surfaces of the second frame 300, but is transferred to peripheral portions of the side surfaces thereof, there may be a risk that the first and second frames 400 and 300 will rotate on the optical axis.

However, in the camera module according to an embodiment, the rotation of the first and second frames 400 and 300 on the optical axis are limited by the first accommodating grooves 520 and 410 provided in the corners of the inner bottom surface of the housing 500 and the corners of the lower surface of the first frame 400, respectively, and the first ball bearing unit 710 fitted into the first accommodating grooves 520 and 410.

Figure 7A:
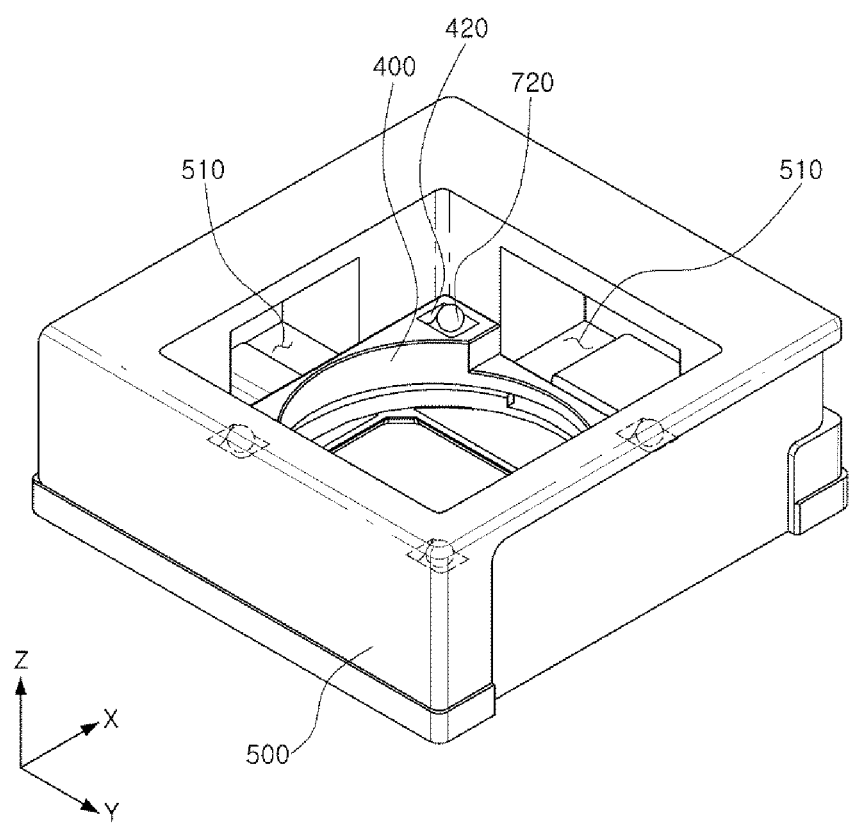
FIG. 7A is a perspective view of the housing, the first frame, and a second ball bearing unit included in the camera module, according to an embodiment of the present disclosure.
Figure 7B:
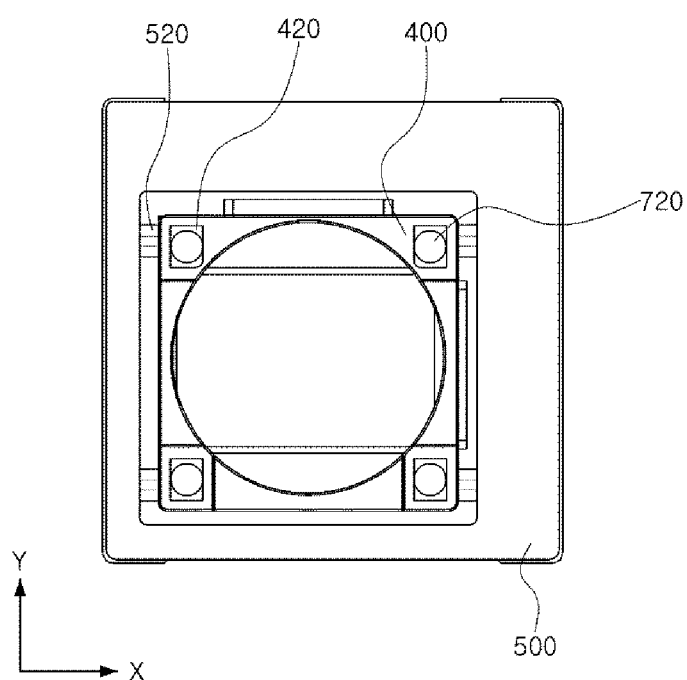
FIG. 7B is a plan view of the housing, the first frame, and the second ball bearing unit included in the camera module, according to an embodiment of the present disclosure.

FIG. 7A is a perspective view of the housing, the first frame, and the second ball bearing unit provided in the camera module, according to an embodiment. FIG. 7B is a plan view of the housing, the first frame, and the second ball bearing unit provided in the camera module, according to an embodiment.

Figure 8A:
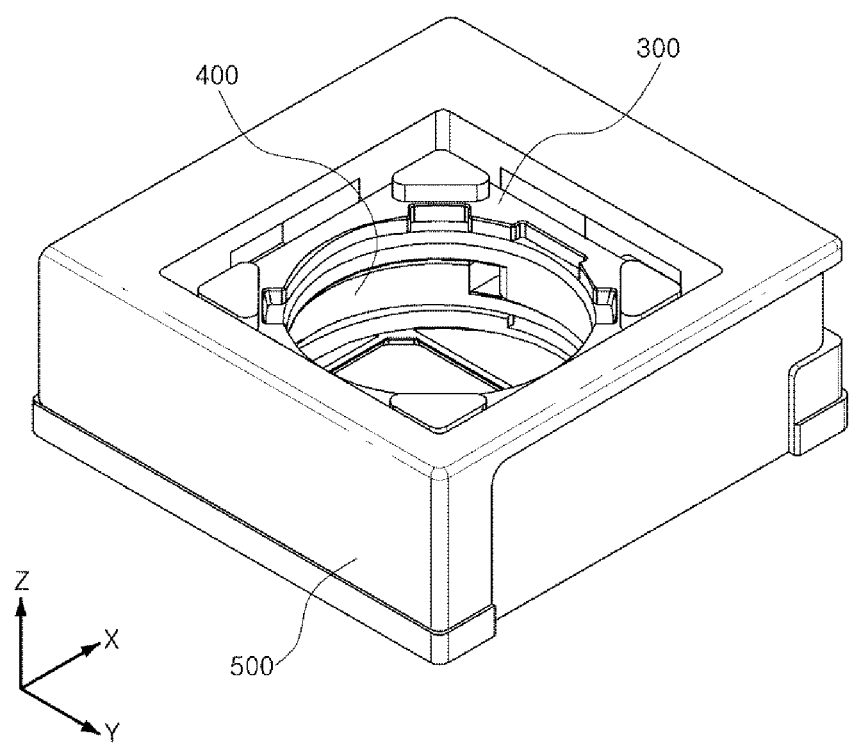
FIG. 8A is a perspective view illustrating a form in which the first frame and a second frame are accommodated in the housing of the camera module, according to an embodiment of the present disclosure.
Figure 8B:
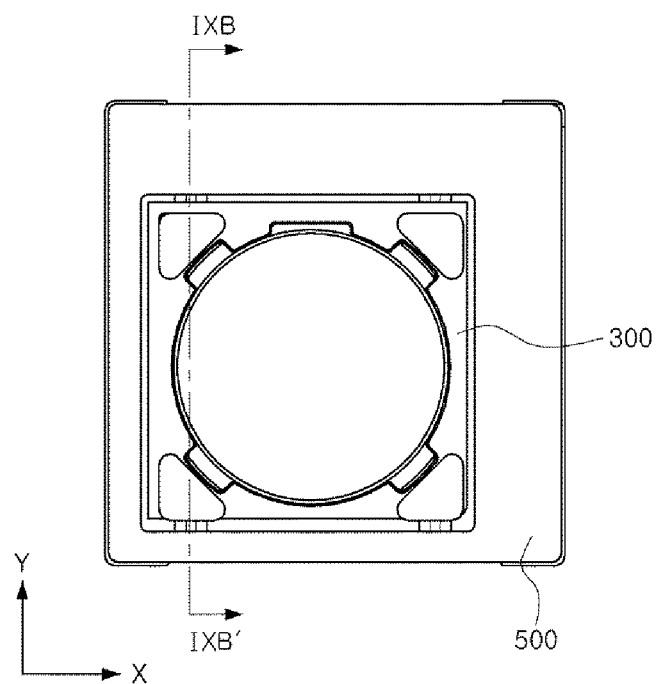
FIG. 8B is a plan view illustrating the form in which the first frame and the second frame are accommodated in the housing of the camera module, according to an embodiment of the present disclosure.

In addition, FIG. 8A is a perspective view illustrating a form in which the first frame and the second frame are accommodated in the housing provided in the camera module, according to an embodiment. FIG. 8B is a plan view illustrating the form in which the first frame and the second frames are accommodated in the housing provided in the camera module, according to an embodiment.

Figure 9A:
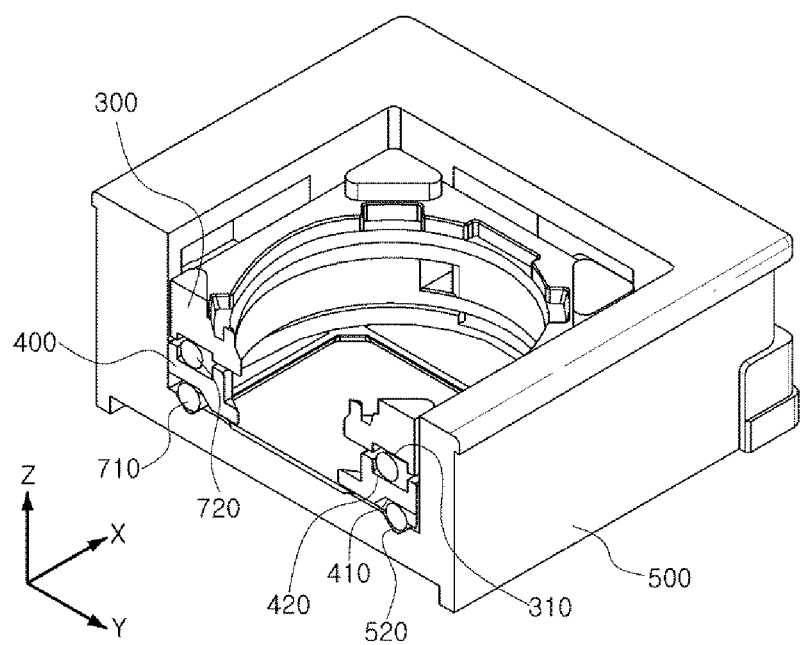
FIG. 9A is a partially cut-away perspective view of FIG. 8A.
Figure 9B:
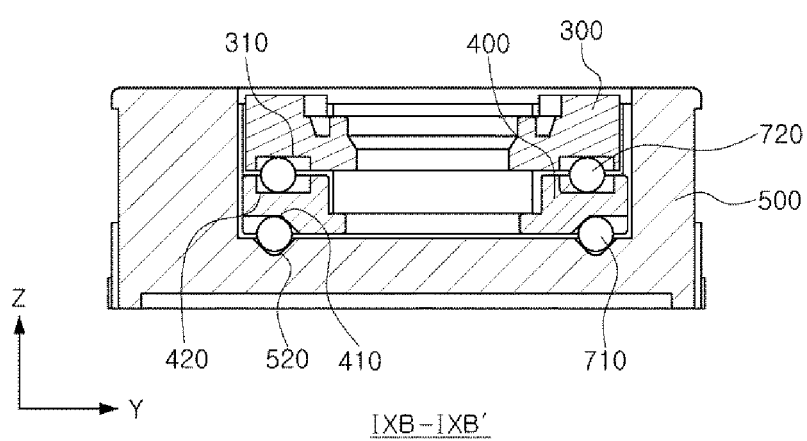
FIG. 9B is a cross-sectional view taken along line B-B' of FIG. 8B.

In addition, FIG. 9A is a partially cut-away perspective view of FIG. 8A. FIG. 9B is a cross-sectional view taken along line B-B' of FIG. 8B.

The second hand-shake correction unit 620 will be described with reference to FIGS. 7A through 9B.

The first and second frames 400 and 300 are accommodated in the housing 500.

The first and second frames 400 and 300 are sequentially disposed in the housing 500. The housing 500, the first frame 400, and the second frame 300 are disposed to be spaced apart from each other in the optical axis direction (the Z direction).

As described above, the first hand-shake correction unit 610 moves the first and second frames 400 and 300 in the first direction (the X direction).

In one illustrative example, the second hand-shake correction unit 620 moves the second frame 300 in the second direction (the Y direction).

The second ball bearing unit 720 is provided between the first and second frames 400 and 300.

As illustrated, the second ball bearing unit 720 includes four ball bearings, in an embodiment, but the number of ball bearings is not limited thereto.

The second ball bearing unit 720 supports the second frame 300 so that the second frame 300 is movable in the second direction (the Y direction) while maintaining an interval from the first frame 400.

The first frame 400 and the second frame 300 include second accommodating grooves 420 and 310, respectively, which accommodate the ball bearings of the second ball bearing unit 720 therein. The second accommodating grooves 420 and 310 are formed in the upper surface of the first frame 400 and the lower surface of the second frame 300, respectively. For example, the second accommodating grooves 420 and 310 are formed in corners of the upper surface of the first frame 400 and corners of the lower surface of the second frame, respectively.

The second ball bearing unit 720 is fitted into the second accommodating grooves 420 and 310 so that the first frame 400 and the second frame 300 are disposed to be spaced apart from each other in the optical axis direction (the Z direction).

The second accommodating grooves 420 and 310 guide the rolling motion of the second ball bearing unit 720 in the second direction (the Y direction) and limit the movement of the second ball bearing unit 720 in a direction perpendicular to the second direction (the Y direction).

For example, a width of each of the second accommodating grooves 420 and 310 (in the X direction) correspond to a size of each ball bearing of the second ball bearing unit 720. A length of each of the second accommodating grooves 420 and 310 (in the Y direction) are long enough in the second direction (the Y direction) to allow the second ball bearing unit 720 to roll therein. In other words, the second accommodating grooves 420 and 310 are longer in the second direction (the Y direction) than in the first direction (the X direction).

Therefore, the second ball bearing unit 720 rolls in the second direction (the Y direction), while the movement thereof is limited in the optical axis (the Z direction) and the first direction (the X direction).

The second hand-shake correction unit 620 moves the second frame 300 in the second direction (the Y direction) while the second ball bearing unit 720 supports the second frame 300.

For instance, the second hand-shake correction unit 620 moves the second frame 300 relative to the first frame 400. As a result, the second hand-shake correction unit 620 performs hand-shake correction in the second direction (the Y direction).

Because the movement of the second ball bearing unit 710 is limited in the optical axis direction (the Z direction) and the first direction (the X direction), the second hand-shake correction unit 620 produces a driving force to move the second frame 300 only in the second direction (the Y direction).

That is, the first hand-shake correction unit 610 and the second hand-shake correction unit 620 each produce a driving force to independently move the second frame 300 in the first direction (the X direction) and the second direction (the Y direction), respectively.

For example, the first hand-shake correction unit 610 produces a driving force to move the first frame 400 in the first direction (the X direction) and without moving the first frame 400 in the second direction (the Y direction) and the optical axis direction (the Z direction). In turn, the second hand-shake correction unit 620 produces a driving force to move the second frame 300 in the second direction (the Y direction) and without moving the second frame 300 in the first direction (the X direction) and the optical axis direction (the Z direction).

In addition, as described above, the driving force from the first hand-shake correction unit 610 does not rotate the first and second frames 400 and 300 around the optical axis, and the driving force from the second hand-shake correction unit 620 does not rotate the second frame 300 around the optical axis.

Furthermore, in one illustrative example, the driving force of the first hand-shake correction unit 610 may be larger than that of the second hand-shake correction unit 620.

Because the first hand-shake correction unit 610 moves the first and second frames 400 and 300, the first hand-shake correction unit 610 generates or produces a larger driving force than the driving force of the second hand-shake correction unit 620 to move the second frame 300.

Figure 10:
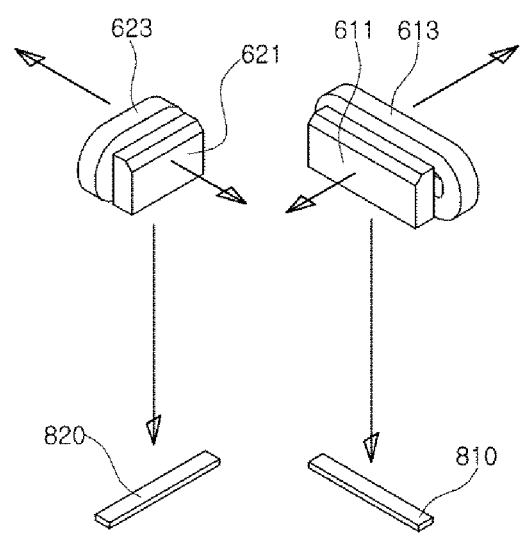
FIG. 10 is a perspective view illustrating a relationship between a hand-shake correction unit and a yoke part, according to an embodiment of the present disclosure.

FIG. 10 is a perspective view illustrating a relationship between a hand-shake correction unit and a yoke part according to an embodiment.

The driving of the hand-shake correction unit 600, according to an embodiment, will be described with reference to FIG. 10.

In the camera module according to an embodiment, magnetic force acts in the optical axis direction (the Z direction) between the housing 500 and the hand-shake correction unit 600.

To this end, a first and second yokes 810 and 820 are provided to face the hand-shake correction unit 600 in the optical axis direction (the Z direction). The first and second yokes 810 and 820 are mounted in the housing 500. For example, the first yoke 810 is mounted on the housing 500 to face the first hand-shake correction unit 610 in the optical axis direction (the Z direction), and the second yoke 820 is mounted in the housing 500 to face the second hand-shake correction unit 620 in the optical axis direction (the Z direction).

In one configuration, the magnetic force acts in the optical axis direction (the Z direction) between the first and second hand-shake correction units 610 and 620 and the first and second yokes 810 and 820.

For example, because the first and second yokes 810 and 820 are formed of a magnetic material, magnetic force acts between the first yoke 810 and the first hand-shake correction unit 610 and magnetic force also acts between the second yoke 820 and the second hand-shake correction unit 620. Here, the magnetic force refers to electrical attractive force.

Because the first and second yokes 810 and 820 are fixed members, the first and second hand-shake correction units 610 and 620 are drawn toward the first and second yokes 810 and 820, respectively, by the magnetic force. In accordance with an alternative configuration, the first and second yokes 810 and 820 are operatively connected on the housing 500. In a further alternative configuration, the first and second yokes 810 and 820 are removable structural elements from the housing 500.

Therefore, the second frame 300 on which the first and second hand-shake correction units 610 and 620 are mounted is drawn toward the housing 500 in which the first and second yokes 810 and 820 are mounted. The movements of the first and second frames 400 and 300 may be limited in the optical axis direction (the Z direction).

In addition, the housing 500 and the first frame 400 maintains contact with the first ball bearing unit 710, and the first and second frames 400 and 300 maintain contact with the second ball bearing unit 720. Therefore, even in the case that external impacts occur, intervals between the housing 500, the first frame 400, and the second frame 300 are maintained, whereby the camera module, according to an embodiment, secures resistance to external impacts, or the like to have improved reliability.

Furthermore, in a state in which a driving signal is not applied to the first and second hand-shake correction units 610 and 620, the first and second frames 400 and 300 are stationary and the electrical attractive force does not move the first and second frames 400 and 300 in the first direction (the X direction) and the second direction (the Y direction).

When the driving signal is applied to the first hand-shake correction unit 610, the driving force is generated in the first direction (the X direction) by the electromagnetic influence between the first magnet 611 and the first coil 613.

In one example, because a magnitude of the driving force of the first hand-shake correction unit 610 is greater than that of the electrical attractive force between the first magnet 611 and the first yoke 810, the driving force from the first hand-shake correction unit 610 moves the first and second frames 400 and 300 in the first direction (the X direction).

However, when the driving signal applied to the first hand-shake correction unit 610 is removed, the first and second frames 400 and 300 return to their initial positions as a result of the electrical attractive force between the first magnet 611 and the first yoke 810.

In one example, the initial positions are positions of the first and second frames 400 and 300 before the driving signal is applied to the first hand-shake correction unit 610.

In addition, when the driving signal is applied to the second hand-shake correction unit 620, the driving force is generated in the second direction (the Y direction) by the electromagnetic influence between the second magnet 621 and the second coil 623.

In an example, because a magnitude of the driving force of the second hand-shake correction unit 620 is larger than that of the electrical attractive force between the second magnet 621 and the second yoke 820, the driving force of the second hand-shake correction unit 620 moves the second frame 300 in the second direction (the Y direction).

However, when the driving signal applied to the second hand-shake correction unit 620 is removed, the electrical attractive force between the second magnet 621 and the second yoke 820 returns the second frame 300 to its initial position.

In an example, the initial position is the position of the second frame 300 before the driving signal is applied to the second hand-shake correction unit 620.

In the camera module according to an embodiment, power consumption during hand-shake correction is significantly decreased.

For example, because the first and second frames 400 and 300 move in a case in which hand-shake correction is required in the first direction (the X direction) and the second frame 300 moves in a case in which hand-shake correction is required in the second direction (the Y direction), the power consumption in correcting the hand-shake decreases.

Figure 11:
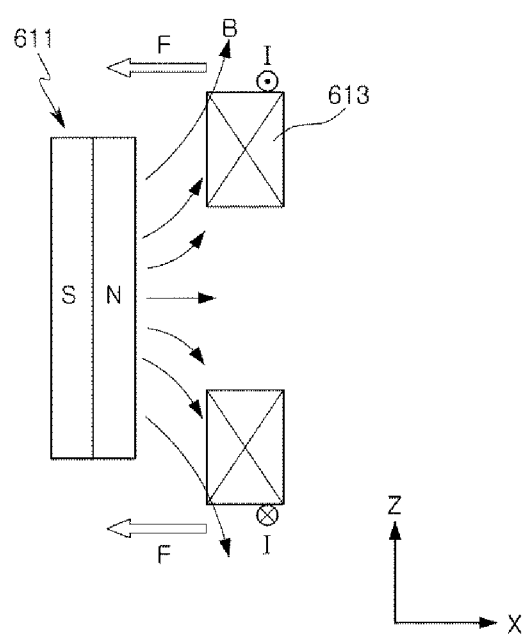
FIG. 11 is a cross-sectional view of a first magnet and a first coil of a first hand-shake correction unit, according to an embodiment of the present disclosure.

FIG. 11 is a cross-sectional view of the first magnet and the first coil provided in the first hand-shake correction unit, according to an embodiment.

The first magnet 611 and the first coil 613 provided in the first hand-shake correction unit 610 are disposed to face each other in the first direction (the X direction) in order to generate the driving force in the first direction (the X direction).

The first hand-shake correction unit 610 generates the driving force in the first direction (the X direction) depending on directions of magnetic force and current illustrated in FIG. 11.

Although only the first hand-shake correction unit 610 is illustrated in FIG. 11 for brevity of explanation, a relationship between the second magnet 621 and the second coil 623 provided in the second hand-shake correction unit 620 may be the same as a relationship between the first magnet 611 and the first coil 613 described above with reference to FIG. 11. Therefore, the second hand-shake correction unit 620 generates the driving force in the second direction (the Y direction).

As described above, in the camera module, according to an embodiment, reliability is secured through increased resistance to external impacts, and the driving displacement at the time of correcting the hand-shake may be prevented.

In addition, at least some of the many advantages associated with the various configurations of the camera module described above, but are not limited to, the power consumption being decreased, and a space for mounting the camera module in a portable electronic device being sufficiently secured. Furthermore, the size of a camera module, according to embodiments, is decreased so as to be mounted in a relatively small space within a portable electronic device. In addition, the degree of design freedom depending on the shapes of the portable electronic device is improved. Further, reliability is secured through increased resistance to external impacts, and during hand-shake correction, driving displacement is prevented and power consumption is decreased.

The apparatuses, units, modules, devices, and other components illustrated in FIGS. 1-11 are implemented by hardware components. Examples of hardware components include controllers, sensors, generators, drivers, and any other electronic components known to one of ordinary skill in the art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
  a housing comprising a first sidewall, a second sidewall disposed adjacent to the first sidewall, a third sidewall disposed adjacent to the second sidewall and opposite the first sidewall, and a fourth sidewall disposed adjacent to the third sidewall and opposite the second sidewall;
  first and second frames accommodated in the housing; and
  a hand-shake correction unit disposed the second frame in the first sidewall and the second sidewall, and configured to generate a driving force in a direction perpendicular to an optical axis of a lens accommodated in the first and second frames,
  wherein the first and second sidewalls are thicker than the third and fourth sidewalls.

2. The camera module of claim 1, wherein the first and second frames are configured to move in a first direction perpendicular to the optical axis, relative to the housing.

3. The camera module of claim 2, wherein the second frame is configured to move in a second direction perpendicular to both the optical axis and the first direction, relative to the first frame.

4. The camera module of claim 3, wherein the hand-shake correction unit comprises
a first hand-shake correction unit configured to generate a driving force in the first direction; and
a second hand-shake correction unit configured to generate a driving force in the second direction.

5. The camera module of claim 4, wherein a magnitude of the driving force generated by the first hand-shake correction unit differs from a magnitude of the driving force generated by the second hand-shake correction unit.

6. The camera module of claim 4, wherein
the first hand-shake correction unit is provided on one side surface of the second frame, and
the second hand-shake correction unit is provided on another side surface of the second frame, adjacent to the one side surface of the second frame.

7. The camera module of claim 6, wherein the first and second hand-shake correction units are disposed to be orthogonal with respect to each other on a plane perpendicular to the optical axis.

8. The camera module of claim 6, wherein the first hand-shake correction unit comprises
a first magnet on the one side surface of the second frame; and
a first coil facing the first magnet.

9. The camera module of claim 8, wherein
an opening is provided in the second sidewall facing the one side surface of the second frame, and
the first coil is disposed within the opening.

10. The camera module of claim 6, wherein the second hand-shake correction unit comprises
a second magnet on the another side surface of the second frame adjacent to the one side surface thereof; and
a second coil facing the second magnet.

11. The camera module of claim 10, wherein
an opening is provided in the second sidewall facing the another side surface of the second frame, and
the second coil is disposed within the opening.

12. The camera module of claim 1, further comprising a first ball bearing unit disposed between the housing and the first frame, and configured to roll in a first direction perpendicular to the optical axis.

13. The camera module of claim 12, wherein the housing and the first frame comprise a first accommodating groove accommodating the first ball bearing unit therein.

14. The camera module of claim 13, wherein the first accommodating groove is configured to guide a rolling motion of the first ball bearing unit in the first direction and to limit movement of the first ball bearing unit in directions perpendicular to the first direction.

15. The camera module of claim 13, wherein the first accommodating groove is provided in four corners of an inner bottom surface of the housing and four corners of a lower surface of the first frame.

16. The camera module of claim 12, further comprising a second ball bearing unit disposed between the first and second frames,
wherein the second ball bearing unit is configured to roll in a second direction perpendicular to both the first direction and the optical axis.

17. The camera module of claim 16, wherein the first and second frames comprise a second accommodating groove accommodating the second ball bearing unit therein.

18. The camera module of claim 17, wherein the second accommodating groove is configured to guide a rolling motion of the second ball bearing unit in the second direction and to limit movement of the second ball bearing unit in directions perpendicular to the second direction.

19. The camera module of claim 17, wherein the second accommodating groove is provided in four corners of an upper surface of the first frame and four corners of a lower surface of the second frame.

20. The camera module of claim 1, wherein magnetic force acts in an optical axis direction between the housing and the hand-shake correction unit.

21. The camera module of claim 20, wherein the housing is provided with a yoke part facing the hand-shake correction unit in the optical axis direction.

22. The camera module of claim 21, wherein magnetic attractive force acts between the hand-shake correction unit and the yoke part.

23. The camera module of claim 21, wherein the hand-shake correction unit comprises
a first hand-shake correction unit configured to generate a driving force in a first direction perpendicular to the optical axis, and
a second hand-shake correction unit configured to generate a driving force in a second direction perpendicular to the first direction and the optical axis, and
the yoke part comprises
a first yoke facing the first hand-shake correction unit in an optical axis direction, and
a second yoke facing the second hand-shake correction unit in the optical axis direction.

24. A camera module comprising:
a housing comprising first, second, third, and fourth sidewalls;
first and second frames disposed within the housing in an optical axis direction; and
a hand-shake correction unit disposed on the first frame or the second frame and configured to generate a driving force in directions perpendicular to the optical axis direction,
wherein the first and second sidewalls are disposed opposite the third and fourth sidewalls, respectively,
wherein centers of the first and second frames are biased to a position offset from a center of the housing by the first and second sidewalls being thicker than the third and fourth sidewalls, and
wherein the first and second frames are configured to limit movement of the first and second frames in the optical axis direction and to limit rotation thereof on an optical axis.

25. The camera module of claim 24, further comprising a first ball bearing unit disposed between the housing and the first frame, wherein the first ball bearing unit is configured to roll in a first direction perpendicular to the optical axis direction.

26. The camera module of claim 25, wherein the housing and the first frame comprise a first accommodating groove accommodating the first ball bearing unit therein.

27. The camera module of claim 26, wherein
the first ball bearing unit accommodated in the first accommodating groove is configured such that movement thereof is limited in a second direction perpendicular to the optical axis direction and the first direction, and
the first accommodating groove is longer in the first direction than in the second direction.

28. The camera module of claim 25, further comprising a second ball bearing unit disposed between the first and second frames, wherein the second ball bearing unit is configured to roll in a second direction perpendicular to both the optical axis direction and the first direction.

29. The camera module of claim 28, wherein the first and second frames comprise a second accommodating groove accommodating the second ball bearing unit therein.

30. The camera module of claim 29, wherein
the second ball bearing unit accommodated in the second accommodating groove is configured such that movement thereof is limited in the optical axis direction and the first direction, and
the second accommodating groove is longer in the second direction than in the first direction.

31. The camera module of claim 24, wherein the housing is provided with a yoke part facing the hand-shake correction unit in the optical axis direction.

32. The camera module of claim 31, wherein the yoke part and the hand-shake correction unit produce a magnetic attractive force.

33. A camera module, comprising:
a lens barrel; and
a housing accommodating the lens barrel therein, and comprising first, second, third, and fourth sidewalls,
wherein the first and second sidewalls are disposed opposite the third and fourth sidewalls, respectively, and
wherein a center of the lens barrel is biased to a position offset from a center of the housing when viewed from an optical axis direction, by the first and second sidewalls being thicker than the third and fourth sidewalls.

34. The camera module of claim 33, wherein the position offset from the center of the housing is spaced apart from the center of the housing in a diagonal direction.

35. A camera module, comprising:
a housing comprising first, second, third, and fourth sidewalls;
a first frame and a second frame accommodating a lens barrel in the housing;
a first hand-shake correction unit configured to generate a driving force to enable movement of the first and second frames in a first direction; and
a second hand-shake correction unit configured to generate a driving force to enable movement of the second frame in a second direction, perpendicular to the first direction,
wherein the first and second sidewalls are disposed opposite the third and fourth sidewalls, respectively, and are thicker than the third and fourth sidewalls, and
wherein the first hand-shake correction unit is disposed in the first sidewall on one external side surface of the first frame or the second frame, and the second hand-shake correction unit is disposed in the first sidewall on another external side surface of the first frame or the second frame.

36. The camera module of claim 35, wherein the first and the second directions are perpendicular to an optical axis of the lens barrel.

37. The camera module of claim 35, wherein the second hand-shake correction unit is disposed on the another external side surface of the first frame or the second frame, adjacent to the one external side surface or opposite to the one external side surface.

38. The camera module of claim 35, wherein the first and second hand-shake correction units are disposed to be orthogonal with respect to each other on the plane perpendicular to an optical axis direction of the lens barrel.

39. The camera module of claim 35, further comprising:
a first ball bearing unit configured to support a movement of the first and second frames with respect to a housing; and
a second ball bearing unit configured to support a movement of the second frame with respect to the first frame.

40. The camera module of claim 35, wherein the first hand-shake correction unit comprises a first magnet and a first coil facing the first magnet configured to generate the driving force in the first direction.

41. The camera module of claim 40, wherein the second hand-shake correction unit comprises a second magnet and a second coil facing the second magnet configured to generate the driving force in the second direction.

42. The camera module of claim 41, the first and second coils are disposed to face the first and second magnets, respectively, in directions perpendicular to an optical axis.

43. The camera module of claim 42, wherein the first and second sidewalls comprises spaces to accommodate the magnets and the coils.

44. The camera module of claim 43, wherein the spaces are on one side of the housing in the first direction and on one side of the housing in the second direction, and a center of the lens barrel is biased toward another side of the housing in the first direction and another side of the housing in the second direction.

45. A portable electronic device including the camera module of claim 35.

46. A portable electronic device including the camera module of claim 33.

47. A portable electronic device including the camera module of claim 24.

48. A portable electronic device including the camera module of claim 1.

49. The camera module of claim 1, wherein the hand-shake correction unit is not disposed in the third and fourth sidewalls.

* * * * *